United States Patent
Razeghi et al.

(10) Patent No.: US 12,546,285 B2
(45) Date of Patent: Feb. 10, 2026

(54) WIND TURBINE BLADE (71) Applicants: BLADE DYNAMICS LIMITED, Hampshire (GB); LM WIND POWER A/S, Kolding (DK)

(72) Inventors: Rama Razeghi, Hampshire (GB); Paul Trevor Hayden, Hampshire (GB); Klavs Jespersen, Kolding (DK); Michael Lund-Laverick, Kolding (DK)

(73) Assignees: BLADE DYNAMICS LIMITED, Hampshire (GB); LM WIND POWER A/S, Kolding (DK)

( * ) Notice: Subject to any disclaimer, the term of this patent is extended or adjusted under 35 U.S.C. 154(b) by 67 days.

(21) Appl. No.: 17/923,719

(22) PCT Filed: May 8, 2020

(86) PCT No.: PCT/EP2020/062902
§ 371 (c)(1),
(2) Date: Nov. 7, 2022

(87) PCT Pub. No.: WO2021/223887
PCT Pub. Date: Nov. 11, 2021

(65) Prior Publication Data
US 2023/0175476 A1    Jun. 8, 2023

(51) Int. Cl.
| | | |
|---|---|---|
| F03D 1/06 | (2006.01) |
| B29C 70/30 | (2006.01) |
| B29C 70/44 | (2006.01) |
| B29C 70/48 | (2006.01) |
| B29C 70/68 | (2006.01) |
| B29C 70/86 | (2006.01) |
| B29L 31/08 | (2006.01) |

(52) U.S. Cl.
CPC ........... *F03D 1/0675* (2013.01); *B29C 70/30* (2013.01); *B29C 70/443* (2013.01); *B29C 70/48* (2013.01);
(Continued)

(58) Field of Classification Search
CPC ...... F03D 1/0675; F03D 1/065; F03D 1/0681; F03D 1/0682; B29C 70/30; B29C 70/443;
(Continued)

(56) References Cited

U.S. PATENT DOCUMENTS 10,487,797 B2 *  11/2019  Hancock .............. B29C 70/865
11,506,171 B2 *  11/2022  Smith .................. F03D 1/0675
(Continued)

FOREIGN PATENT DOCUMENTS

| EP | 2444660 A1 | 4/2012 |
| WO | 2007098769 A1 | 9/2007 |
| WO | 2016130235 A1 | 8/2016 |

OTHER PUBLICATIONS

K.P. Shah, Practical Maintenance, Apr. 14, 2015, The Hand Book on Mechanical Maintenance, p. 8 (Year: 2015).*

*Primary Examiner* — Andrew J Marien
(74) *Attorney, Agent, or Firm* — Nath, Goldberg & Meyer; Tanya E. Harkins (57) ABSTRACT

A method of manufacturing a wind turbine blade, comprising the steps of:
placing one or more shell fibre layers on a mould surface of a blade mould,
placing a plurality of separately provided preforms directly on the one or more shell fibre layers in a stacked arrangement,
infusing and curing the stacked preform arrangement, the one or more shell fibre layers together via a resin in mould cavity of the blade mould to form a wind turbine blade part with a spar cap integrated in a shell part providing part of the aerodynamic shape of the wind turbine blade.

16 Claims, 7 Drawing Sheets

(52) U.S. Cl.
CPC .......... *B29C 70/682* (2013.01); *B29C 70/683* (2013.01); *B29C 70/865* (2013.01); *F03D 1/065* (2013.01); *F03D 1/0681* (2023.08); *F03D 1/0682* (2023.08); *B29L 2031/085* (2013.01); *F05B 2230/90* (2013.01); *F05B 2280/6003* (2013.01)

(58) Field of Classification Search
CPC ..... B29C 70/48; B29C 70/682; B29C 70/683; B29C 70/865; B29L 2031/085; F05B 2230/90; F05B 2280/6003
See application file for complete search history.

(56) References Cited

U.S. PATENT DOCUMENTS

| | | | | |
|---|---|---|---|---|
| 2004/0253114 | A1* | 12/2004 | Gunneskov | F03D 1/0675 416/224 |
| 2009/0169392 | A1* | 7/2009 | Kuroiwa | F03D 1/0675 416/241 A |
| 2010/0209651 | A1* | 8/2010 | Mikkelsen | B29C 70/443 428/56 |
| 2012/0087801 | A1* | 4/2012 | Driver | B29C 70/34 156/182 |
| 2012/0093656 | A1* | 4/2012 | Esaki | F03D 1/0675 416/229 R |
| 2015/0023799 | A1* | 1/2015 | Wetzel | F03D 1/0675 416/229 R |
| 2015/0151390 | A1* | 6/2015 | Upton | F03D 1/0675 29/889.7 |
| 2015/0308404 | A1* | 10/2015 | Dahl | F03D 13/10 156/60 |
| 2018/0372065 | A1* | 12/2018 | Livingston | F03D 1/0675 |
| 2019/0010919 | A1* | 1/2019 | Nielsen | B29D 99/0025 |
| 2019/0270261 | A1* | 9/2019 | Randall | B29C 70/342 |
| 2020/0318604 | A1* | 10/2020 | Girolamo | F03D 1/0675 |
| 2021/0379842 | A1* | 12/2021 | Schirner | B29D 99/0028 |
| 2022/0154684 | A1* | 5/2022 | Glud | B32B 5/26 |
| 2022/0333573 | A1* | 10/2022 | Atutxa Briones | F03D 1/0675 |
| 2022/0333574 | A1* | 10/2022 | Rojo Saiz | B29D 99/0028 |

* cited by examiner

WIND TURBINE BLADE

This is a National Phase Application filed under 35 U.S.C. 371 as a national stage of PCT/EP2020/062902, filed May 8, 2020, the content of which is hereby incorporated by reference in its entirety.

TECHNICAL FIELD

The present disclosure relates to a method for manufacturing a wind turbine blade and such a wind turbine blade.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more wind turbine blades. The wind turbine blades capture kinetic energy of wind using known airfoil principles. The wind turbine blades transmit the kinetic energy in the form of rotational energy so as to turn a shaft coupling the wind turbine blades to a gearbox or, if a gearbox is not used, directly to the generator. The generator then converts the mechanical energy into electrical energy that may be deployed to a utility grid.

Wind turbine blades have become increasingly longer over the years and may today have a length of 80 metres or more and may weigh tens of tons. The wind turbine blades extend along a spanwise axis from a blade root through a root region and an airfoil region to a tip region with the blade tip, and generally comprise a suction side shell and a pressure side shell typically formed using a moulding process, such as vacuum-assisted resin transfer moulding, and that are bonded together at bond lines along the leading and trailing edges of the blade. Each shell part generally comprises an outer gelcoat to provide an aerodynamic outer surface. Further, the pressure and suction shells are relatively lightweight and have structural properties (e.g. stiffness, buckling resistance and strength) which are not configured to withstand the bending moments and other loads exerted on the wind turbine blade during operation. Thus, to increase the stiffness, buckling resistance and strength of the wind turbine blade, the body shell is typically reinforced using one or more structural components that engage the inner pressure and suction side surfaces of the shell halves. Typically, the primary load-bearing portion of the wind turbine blade is formed either of a so-called box spar, which is often separately manufactured and adhered to each blade shell, or of two individual spar caps each integrated into a blade shell. The present disclosure relates to such a spar cap being integrated into a blade shell.

Conventionally, a spar cap is a sandwich-structured composite and comprises a core sandwiched between two fibre-reinforced glass fibre laminates. The spar caps are connected by shear webs to form the primary load-bearing structure of the assembled wind turbine blade. Typically, the core of spar caps comprises a combination of a low-cost and low-strength material such as balsa wood or foams and a high-strength and high-cost fibre-reinforced portion, also known as a main laminate.

Traditionally, the spar caps have been manufactured during layup of the shell fibre sheets forming the shell part by stacking additional fibre sheets at the desired main laminate location, then positioning core inserts adjacently, and infusing the main laminate and core inserts with the shell part to form a spar cap integrated into the shell part. However, recent developments have led to the fibre sheet stack main laminate being replaced by a main laminate formed by a single prefabricated pultrusion element. While such a pultrusion main laminate have advantages over a main laminate of fibre sheet stack, e.g. in reduced manual layup and predictability in mechanical properties, the pultrusion main laminate has a drawback of low drapability, which reduces the ability of the pultrusion main laminate to conform to the transverse contour of the blade shell.

This can lead to hidden wrinkles during layup or infusion in shell fibre sheets due to the pultrusion main laminate sliding over the shell fibre sheets. Further, the pultrusion main laminate may, due to the low drapability, disengage from the shell fibre sheets resulting in resin pools occurring during infusion. Resin pools lower the strength-to-weight ratio of the wind turbine blade while wrinkles reduce the strength of the main laminate.

Another drawback is that a pultrusion main laminate must be placed rather precisely relative to adjacent core inserts to avoid gaps between the pultrusion main laminate and the core insert which can cause resin pools.

Another drawback is that the pultrusion main laminate can only be configured in one dimension, due to the pultrusion process, which reduces the ability of the blade designer to tailor the strength of the pultrusion main laminate to the blade loads. This can lead to a main laminate which is overengineered at some parts of the blade in order to achieve a desired strength at other parts of the blade.

SUMMARY

On this background, it may be seen as an object of the present disclosure to provide a method of manufacturing a wind turbine blade with increased design flexibility.

Another object of the present disclosure is to provide a wind turbine blade with a more flexible spar cap.

One or more of these objects may be met by aspects of the present disclosure as described in the following.

A first aspect of this disclosure relates to a method of manufacturing a wind turbine blade extending along a spanwise axis from a blade root through a root region and an airfoil region to a tip region with the blade tip, the wind turbine blade having a profiled contour including a pressure side, a suction side and a chord line extending between a leading edge and a trailing edge, the wind turbine blade comprising a shell providing the aerodynamic shape of the wind turbine blade and a spar cap forming a load carrying structure of the wind turbine blade, the method comprising the steps of:

providing a blade mould for a wind turbine blade part having a mould cavity with a mould surface, placing one or more shell fibre layers and optionally an exterior coat on the blade mould surface, placing a plurality of separately provided preforms directly on the one or more shell fibre layers in a stacked arrangement, wherein each preform comprises a mixture of fibre material and a binding agent, wherein the fibre material of each preform is at least partially joined together by means of the binding agent, infusing the stacked preform arrangement, the one or more shell fibre layers and the optional exterior coat with a resin in mould cavity of the blade mould, and curing the stacked preform arrangement, the one or more shell fibre layers and the optional exterior coat together via the resin to form a wind turbine blade part with a spar cap integrated in a shell part providing part of the aerodynamic shape of the wind turbine blade.

Such a method allows manufacturing of multiple blade configurations using the same preforms which can be standardised with more predictable mechanical properties. Further, preforms have the advantage of being able to conform to the mould surface during the infusion process and thus avoid resin pools and wrinkling of shell fibre layers.

Additionally or alternatively, the extent of each preform in the chordwise direction may be at least 10 times, such as at least 20 times, of its extent in the thickness direction.

Additionally or alternatively, each preform may have a thickness of 10 mm or less.

Additionally or alternatively, the stacked preform arrangement, the one or more shell fibre layers and the optional exterior coat may be infused in a vacuum pressure environment, optionally in a vacuum-assisted resin transfer moulding process.

By infusing the preforms under a vacuum pressure, the shape of the preforms will conform to the mould surface due to the vacuum pressure and retains this advantageous shape when cured. A vacuum pressure may in this regard be an absolute pressure less than 1 atmosphere.

Additionally or alternatively, the stacked preform arrangement may comprise at least 20 preforms, such as at least 50 preforms.

By providing a large number of preforms, the individual preforms may be made smaller and thus easier to handle compared to full-sized pultrusions.

Additionally or alternatively, the stacked preform arrangement may comprise:
two or more preforms in the chordwise direction, and/or
two or more preforms in the thickness direction, and/or
two or more preforms in the spanwise direction.

Additionally or alternatively, the plurality of preforms may be arranged in a staggered manner or offset manner in the stacked preform arrangement.

Additionally or alternatively, the ends of the plurality of preforms may be offset or staggered relative to each other so as to provide an offset or staggered stacked preform arrangement.

Additionally or alternatively, the plurality of preforms may be placed in a staggered or offset manner in a plane defined by the spanwise direction and the chordwise direction.

Additionally or alternatively, the plurality of preforms may be placed in a staggered or offset manner in a plane defined by the thickness direction and the chordwise direction.

Additionally or alternatively, the plurality of preforms may be placed in a staggered or offset manner in a plane defined by the thickness direction and the spanwise direction.

Additionally or alternatively, each layer of preforms may be offset relative to adjacent layers.

Additionally or alternatively, a core insert may be placed directly on the exterior shell and adjacent to the stacked preform arrangement in a chordwise direction.

Additionally or alternatively, an end of the stacked preform arrangement facing the leading edge or the trailing edge of the wind turbine blade may he bevelled, and an end of the stacked preform arrangement facing the interior of the wind turbine blade may define an acute angle with the bevelled side, the method may further comprise:
placing a core insert with a bevelled side directly on the exterior shell and subsequently placing a plurality of preforms directly on the exterior shell in a stacked arrangement so that, after infusion, the bevelled side of the core insert and the bevelled side of the stacked preform arrangement form a scarf joint.

Additionally or alternatively, an end of the stacked preform arrangement facing the leading edge or the trailing edge of the wind turbine blade may he bevelled, and an end of the stacked preform arrangement facing the exterior of the wind turbine blade may define an acute angle with the bevelled side, the method may further comprise:
placing a plurality of preforms directly on the exterior shell in a stacked arrangement and subsequently placing a core insert with a bevelled side directly on the exterior shell so that, after infusion, the bevelled side of the core insert and the bevelled side of the stacked preform arrangement form a scarf joint.

Additionally or alternatively, an end of the stacked preform arrangement facing the leading edge or the trailing edge of the wind turbine blade may be concave and may be shaped as > or <. The preform arrangement may be shaped as a concave hexagon.

Additionally or alternatively, the binding agent of at least one preform, optionally of each preform, may be present in an amount of 0.1-15 wt %, preferably 0.5-5 wt %, relative to the weight of the fibre material.

Additionally or alternatively, the binding agent of at least one preform, optionally of each preform, may comprise a polyester, preferably a bisphenolic polyester.

A preform typically comprises a fibre material and a binding agent, e.g. a wax material, resulting in a "soft" solid with a stiffness between pultrusion inserts and fibre-reinforced fabric sheets. These constituents allow the preform to maintain its shape during layup and to plastically conform to the blade shell during the infusion process.

Additionally or alternatively, at least one preform, optionally each preform, may have an elastic modulus between 0.01 and 100 GPa, preferably between 0.01 and 45 GPa. The elastic modulus may also be known as Young's modulus.

A second aspect of this disclosure relates a wind turbine blade with a profiled contour including a pressure side and a suction side with a thickness direction extending therebetween, and a leading edge and a trailing edge with a chord having a chordwise direction extending therebetween, the wind turbine blade extending in a spanwise direction between a root end and a tip end, the spar cap extending in the spanwise direction, the chordwise direction, and the thickness direction, the wind turbine blade comprising:
an exterior shell providing the profiled contour of the wind turbine blade and comprising one or more shell fibre layers, and
a spar cap being a sandwich-structured composite including one or more inner fibre layers and a core portion sandwiched between the one or more inner fibre layers and the exterior shell, the core portion comprising a plurality of separately provided preforms arranged in a stacked preform arrangement, wherein each preform comprises a mixture of fibre material and a binding agent, wherein the fibre material is at least partially joined together by means of the binding agent, wherein the plurality of preforms and the exterior shell are joined together by means of a resin.

A spar cap having a core portion comprising a plurality of preforms has the advantage that the preforms can be made smaller and standardised with more predictable mechanical properties and used in various blade configurations. Smaller preforms are easier to handle compared to a full-sized pultrusion. Additionally, preforms have the advantage of being able to conform to the blade shape and thus avoid wrinkling of shell fibre layers.

Additionally or alternatively, at least one preform, or optionally each preform, may have a greater extent in the chordwise direction relative to the extent in the thickness direction.

Additionally or alternatively, the extent of at least one preform, or optionally of each preform, in the chordwise direction may be at least 10 times, such as at least 20 times, of its extent in the thickness direction.

Additionally or alternatively, at least one preform, or optionally each preform, may have a thickness of 10 mm or less.

Additionally or alternatively, the stacked preform arrangement may comprise at least 20 preforms, such as at least 50 preforms.

Additionally or alternatively, the stacked preform arrangement may comprise two or more preforms in the chordwise direction.

Multiple inserts stacked in the chordwise direction allow increased design choice in the interface between the preform arrangement and core insert, e.g. an undercut while minimising risk of wrinkles and/or resin pools.

Additionally or alternatively, the number of preforms of the stacked arrangement in the chordwise direction may vary along the spanwise direction.

Additionally or alternatively, the stacked preform arrangement may comprise two or more preforms in the thickness direction.

Additionally or alternatively, the number of preforms of the stacked arrangement in the thickness direction may vary along the spanwise direction.

Additionally or alternatively, the stacked preform arrangement may comprise two or more preforms in the spanwise direction.

Additionally or alternatively, the stacked preform arrangement may be arranged in a staggered manner or offset manner in a plane defined by the spanwise direction and the chordwise direction, and/or in a plane defined by the thickness direction and the chordwise direction, and/or in a plane defined by the thickness direction and the spanwise direction.

Additionally or alternatively, at least two adjacent preforms in a layer of the stacked preform arrangement may be joined by a joint, preferably a scarf joint or a butt joint.

Additionally or alternatively, the wind turbine blade may further comprise a core insert arranged directly on the exterior shell and adjacent to the stacked preform arrangement in a chordwise direction.

Additionally or alternatively, the core insert may comprise a wood material, such as balsa wood, or a foam material, such as a closed cell foam.

Additionally or alternatively, an end of the stacked preform arrangement facing the leading edge or the trailing edge of the wind turbine blade may be bevelled, and an end of the stacked preform arrangement facing the interior of the wind turbine blade may define an acute angle with the bevelled side, and the bevelled side of the stacked preform arrangement and a bevelled side of the core insert may form a scarf joint. The bevelled side may alternatively be tapering.

Such an arrangement may have the advantage of a strong joint in the form of a scarf joint between the core insert and preform arrangement while avoiding problems with wrinkles in the exterior shell and resin pools in the joint as the preforms conform to the shape of the exterior shell during infusion.

Additionally or alternatively, an end of the stacked preform arrangement facing the leading edge or the trailing edge of the wind turbine blade may be bevelled, and an end of the stacked preform arrangement facing the exterior of the wind turbine blade may define an acute angle with the bevelled side, wherein the bevelled side of the stacked preform arrangement and a bevelled side of the core insert may form a scarf joint. The bevelled side may alternatively be tapering.

Additionally or alternatively, an end of the stacked preform arrangement facing the leading edge or the trailing edge of the wind turbine blade may be concave and may be shaped as > or <. The preform arrangement may be shaped as a concave hexagon.

A third aspect of this disclosure relates to a wind turbine blade obtainable by a method according to the first aspect.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

Figure 1:
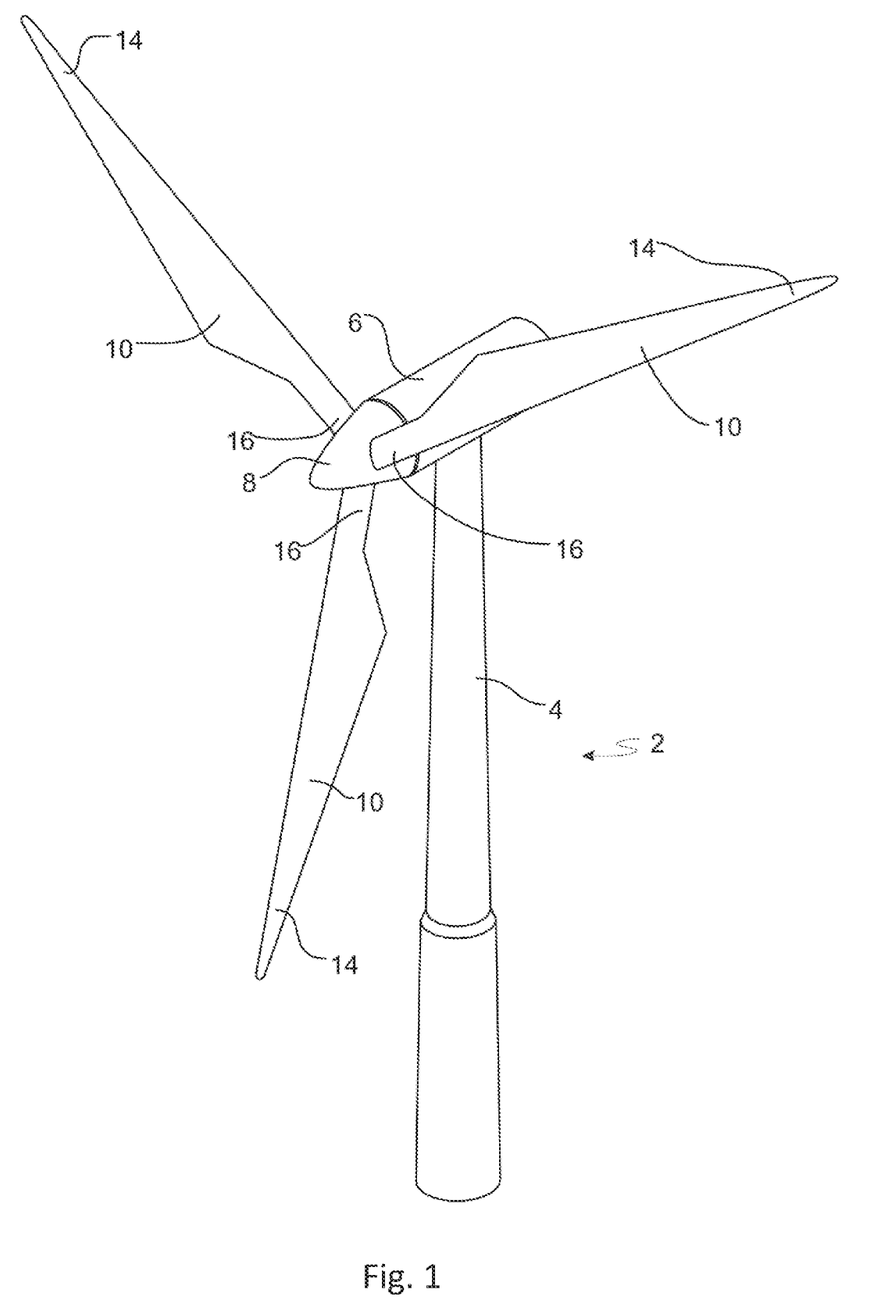
FIG. 1 is a schematic perspective view illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
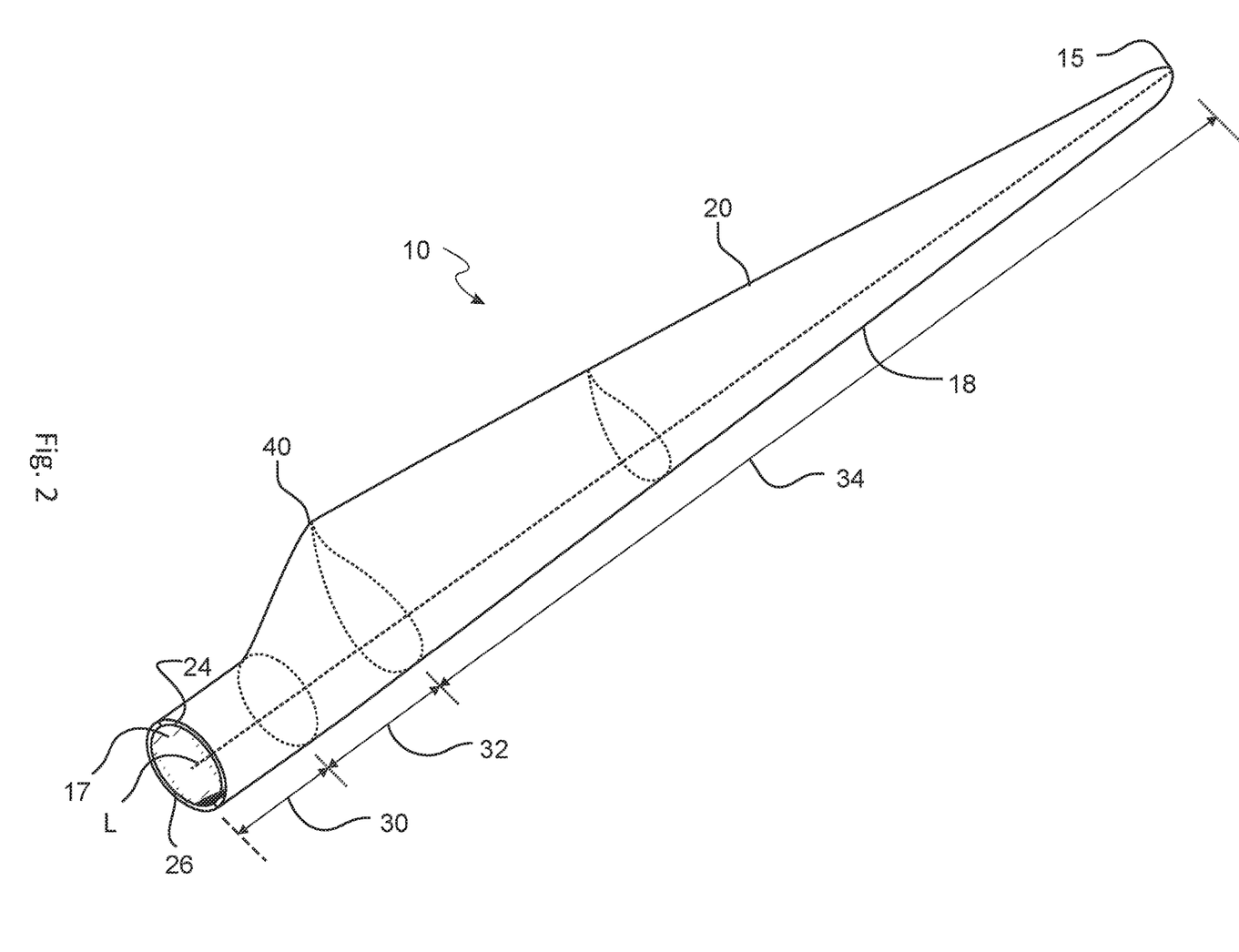
FIG. 2 is a schematic perspective view illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub 8, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root region 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints extending along the trailing edge 20 and the leading edge 18 of the blade 10. Typically, the root ends of the blade shell parts 24, 26 have a semi-circular or semi-oval outer cross-sectional shape. The blade shell parts 24, 26 define the aerodynamic shape of the wind turbine blade but require a spar cap to have the load carrying structure to support the weight of the wind turbine blade.

Figure 3:
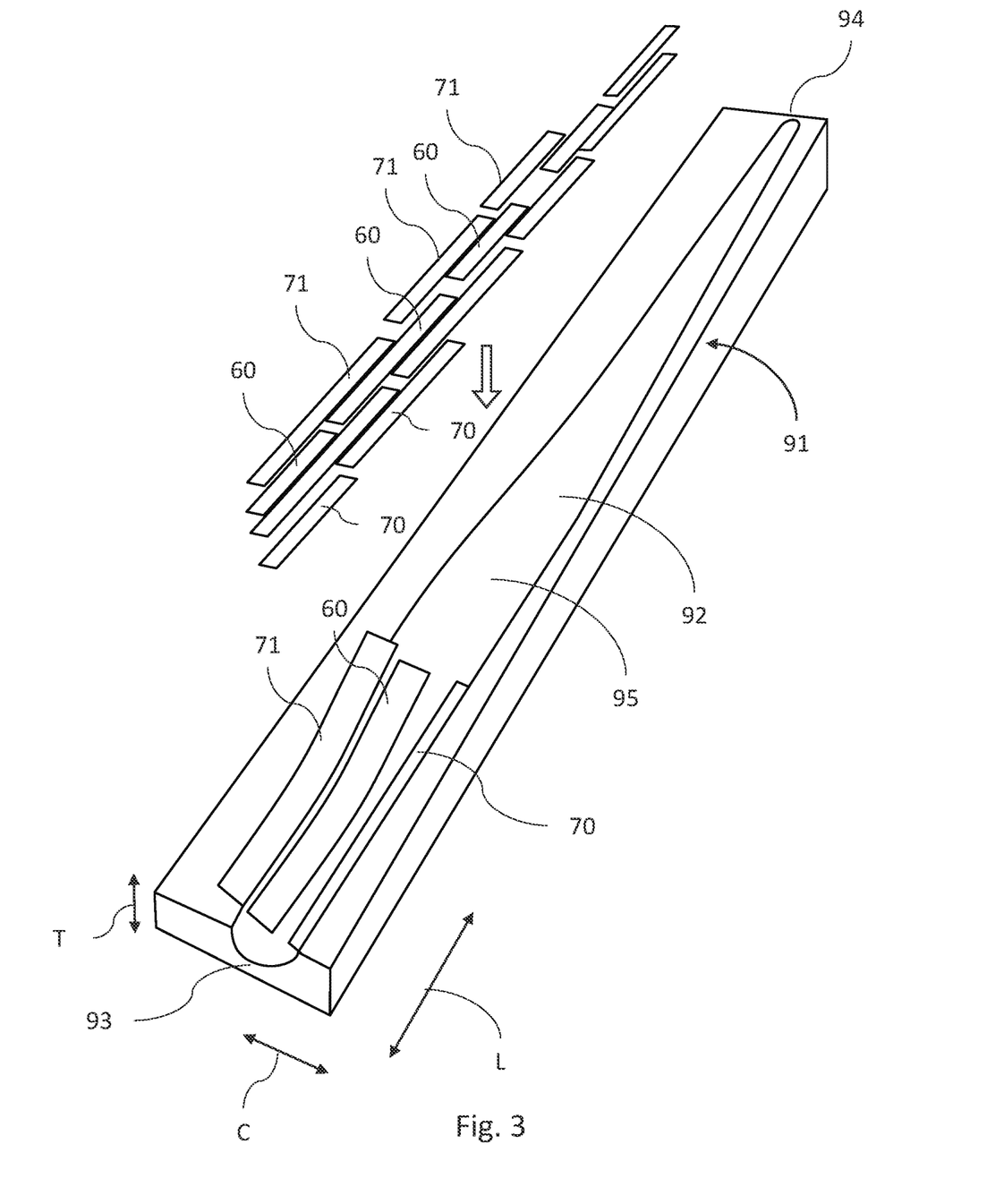
FIG. 3 is a schematic perspective view illustrating a step of laying up preforms in a blade shell mould.
Figure 7A:
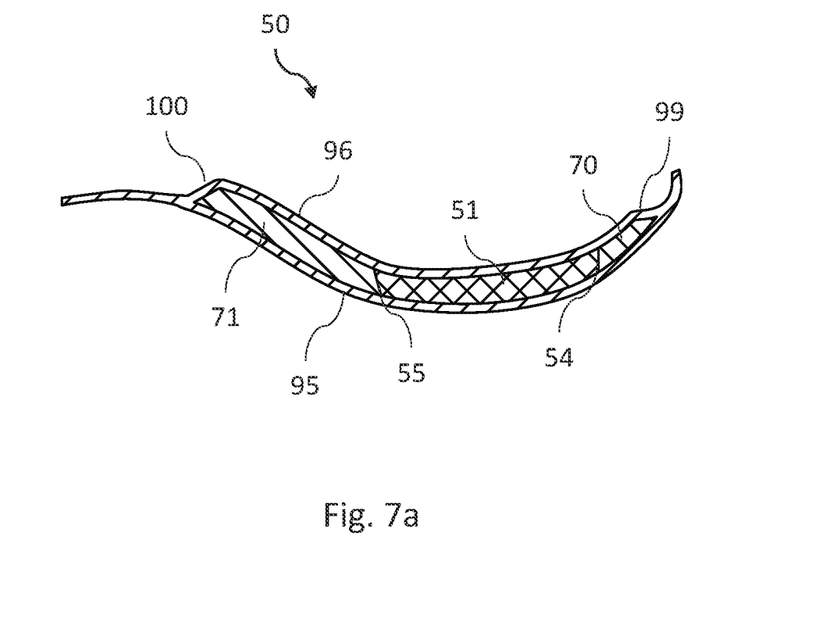
FIGS. 7*a*-7*b* are schematic cross-sectional views of a first and a second spar cap configuration, respectively.
Figure 7B:
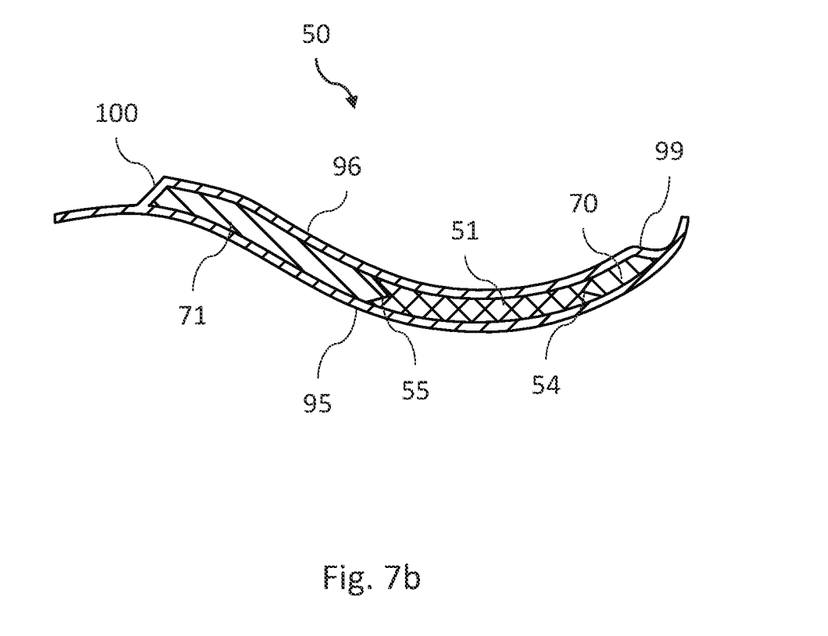

In the following, embodiments of a method for manufacturing such a wind turbine blade is disclosed. A blade mould 91 for a wind turbine blade part is provided as shown in FIG. 3. The blade mould 91 extends between a tip end 94 and a root end 93 and has a mould cavity 92 with a mould surface (not shown). An exterior gel coat is provided on the mould surface and is covered by several shell glass fibre layers 95 which will form the exterior shell of the wind turbine blade. The load-bearing capability will be provided by a spar cap which comprises a core portion. The core portion is formed by lowering a plurality of separately provided preforms 60 directly on the shell fibre layers 95 in several stacked layers from a bottom layer through a number of intermediate layers to a top layer to a stacked preform arrangement. The core portion of the spar cap 50 further comprises core inserts 70, 71 of balsa wood which are arranged adjacent to both sides of the plurality of preforms 60. Then, the core inserts 70, 71 and the preform arrangement 51 forming the core portion of the spar cap 50 are covered by one or more inner glass fibre layers and infused and cured to arrive at the spar cap 50 integrated with the exterior shell fibre layers as shown in FIGS. 7a-7b. These steps are disclosed in greater detail below.

Figure 4A:
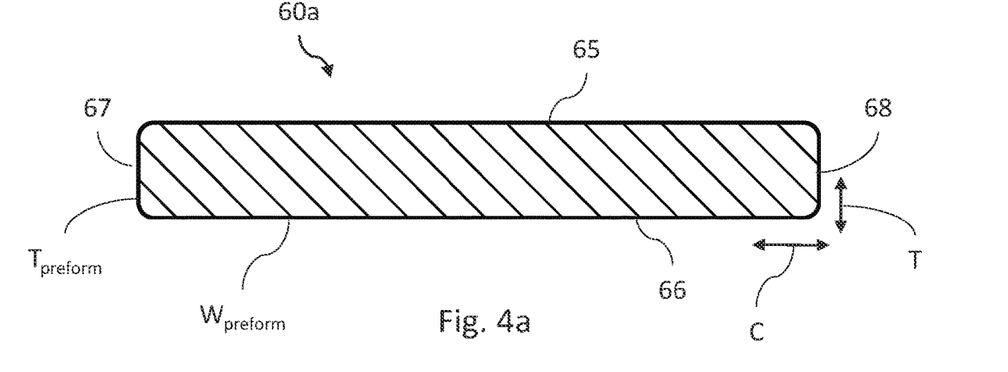
FIGS. 4*a*-4*c* are schematic cross-sectional views of three different preforms.
Figure 4B:
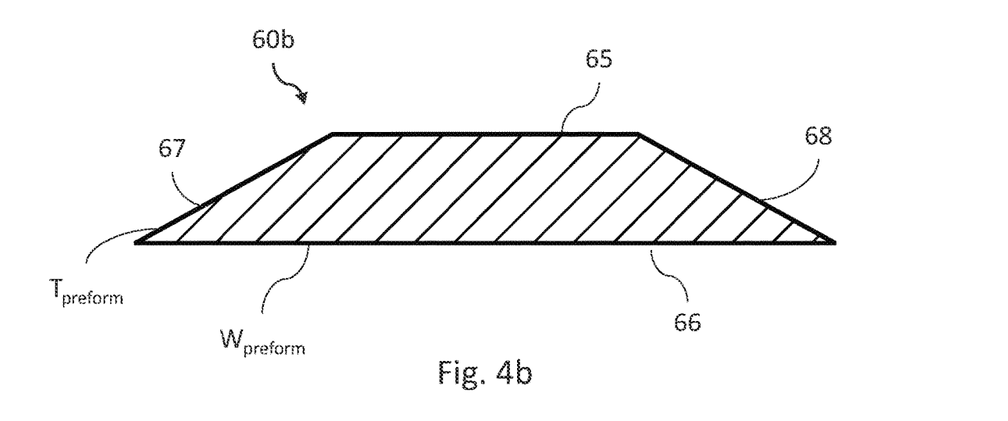
Figure 4C:
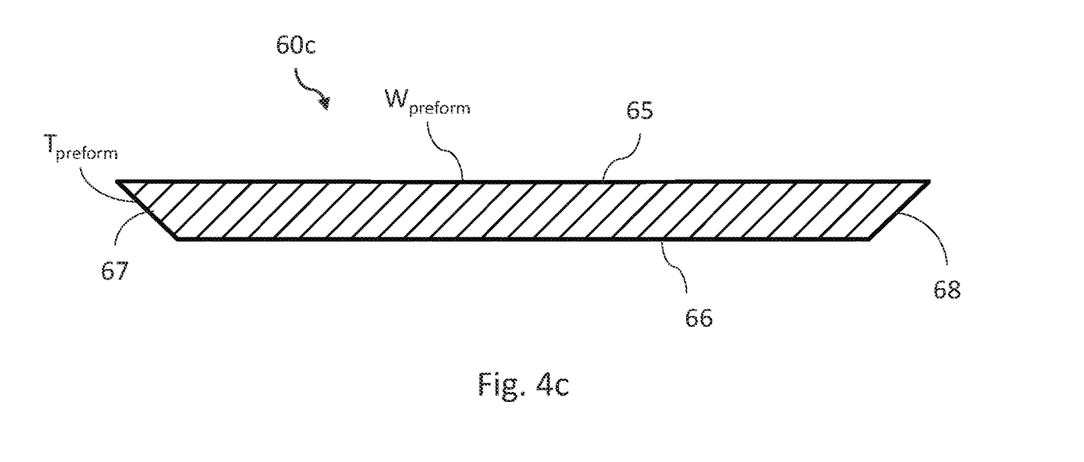

FIGS. 4a-4c show different shaped preforms 60a, 60b, 60c having a top face 65, a bottom face 66 opposite of the top face 65, a first side face 67, and a second side face 68 opposite of the first side face 67. Each preform 60 comprises a mixture of carbon fibres (not shown) and a wax-like binding agent (not shown) comprising a bisphenolic polyester present in an amount 0.5-5 wt % relative to the weight of the carbon fibres. The carbon fibres of each preform 60 are joined together by means of the binding agent. The preforms 60 thus act like a "soft" solid with a stiffness between uncured fibre sheets and pultrusions, i.e. increased shape retention relative to uncured carbon fibre sheets while also allowing plastic deformation without breaking in contrast to pultrusions. The preforms 60 are arranged in the same orientation in the figures, i.e. the chordwise direction is along the left-right direction across the paper and the thickness direction T is in the up-down direction as shown in FIG. 4a. For instance, a first preform 60a is a preform plank with a rectangular cross-section as shown in FIG. 4a. A second preform 60b has a truncated pyramid cross-section while a third preform 60c has an upside-down truncated pyramid cross-section, so that a bottom face 66 of the second preform 60b has a greater chordwise extent than a bottom face 66 of the third preform 60b. The thickness $T_{preform}$ of the preforms may be in about 5 mm while the width $W_{preform}$ of the preforms may be in the range of 160 mm-800 mm. The preforms 60a, 60b, 60c can be stacked in a preform arrangement that has desirable properties as will be described in the following. The shape of the preforms is chosen depending on the desired shape of the stacked preform arrangement.

Figure 5A:
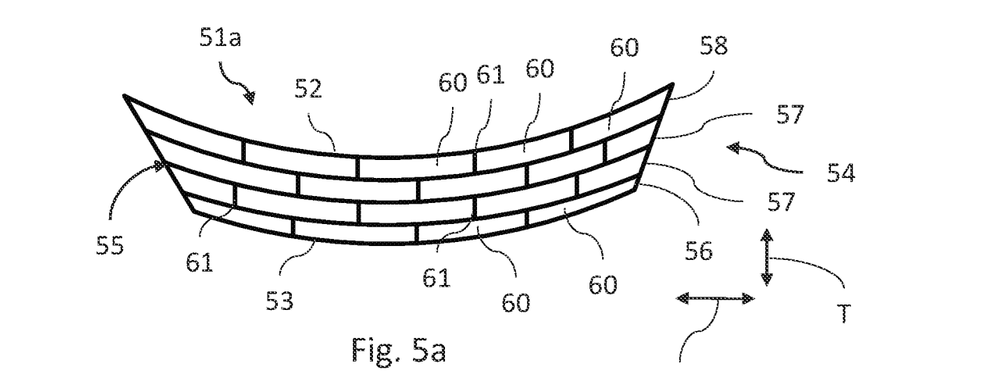
FIGS. 5*a*-5*d* are schematic cross-sectional views of four different stacked preform arrangements.
Figure 5B:
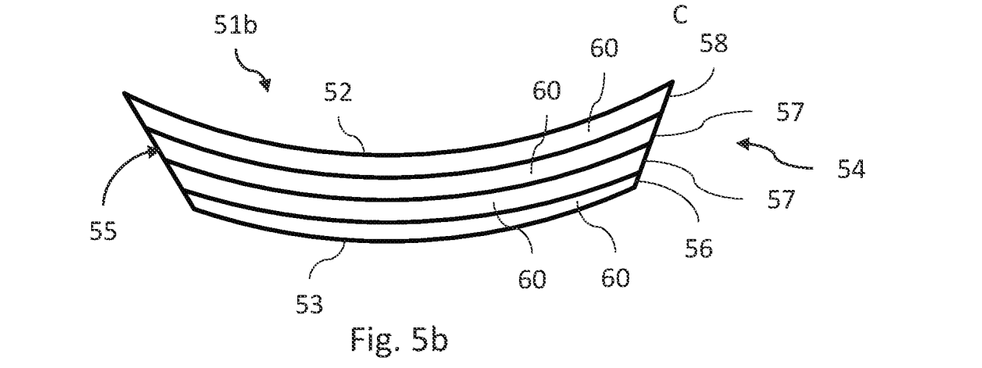
Figure 5C:
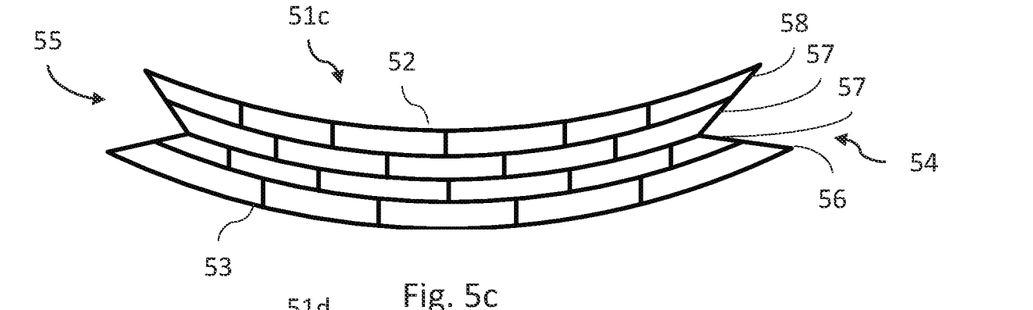
Figure 5D:
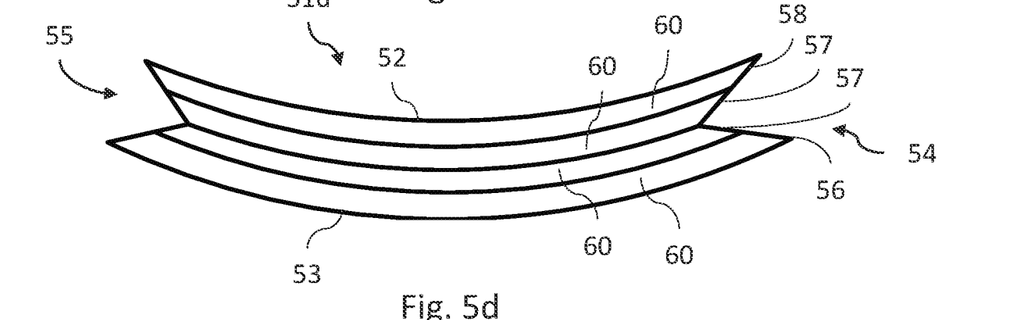
Figure 6:
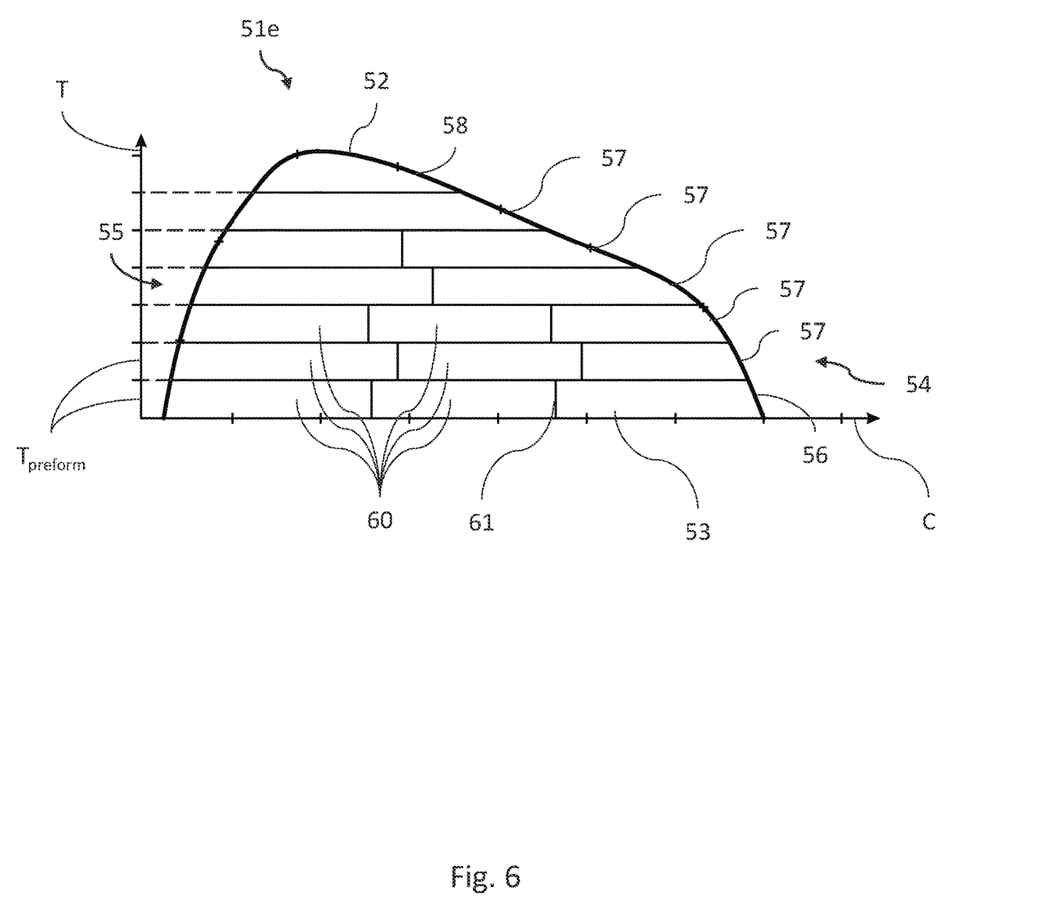
FIG. 6 is a schematic cross-sectional view of a fifth stacked preform arrangement.

FIGS. 5-6 show five different stacked preform arrangements 51a, 51b, 51c, 51d, 51e. Generally, the preform arrangements 51a, 51b, 51c, 51d, 51e have a top side 52 for facing the interior of the wind turbine blade 10, a bottom side 53 for facing the exterior of the wind turbine blade 10, a leading edge end 54 for facing the leading edge 18 of the wind turbine blade 10, and a trailing edge end 55 for facing the trailing edge 20 of the wind turbine blade 10. The preform arrangements 51a, 51b, 51c, 51d, 51e comprise a plurality of preforms 60 arranged in a plurality of layers 56, 57, 58 stacked on top of each other in the thickness direction T including a bottom layer 56, a top layer 58, and a number of intermediate layers 57. For instance, the first, second, third, and fourth preform arrangements 51a, 51b, 51c, 51d all comprise two intermediate layers 57 while the fifth preform arrangement comprises five intermediate layers 57. Each layer 56, 57, 58 comprises a number of preforms 60 arranged side-by-side and joined at chordwise joints 61. The first four preform arrangements 51a, 51b, 51c, 51d are shown in their curved shape post-infusion in which the top side 52 and bottom side 53 are curved and conform to the shape of the mould surface of the blade mould, while the top side and bottom side 52, 53 are substantially straight prior to infusion and curing. The fifth preform arrangement 51e is shown in the pre-infusion state with a straight bottom side 53.

The cross-section of the first and second preform arrangements 51a, 51b is shaped as a truncated pyramid wherein the leading edge end 54 and the trailing edge end 55 are straight and tapering, the top side 52 and the bottom side 53 are curved, and the top side 52 has a greater extent in the chordwise direction C relative to the bottom side 53.

The cross-section of the third and fourth preform arrangements 51c, 51d is shaped as an irregular concave hexagon wherein the trailing edge end 55 and the leading edge end 54 are shaped as > and < respectively to reduce stress concentrations, and the top side 52 and bottom side 53 are curved in the chordwise direction C and have substantially the same extent in the chordwise direction C.

In this particular embodiment, the first and third preform arrangements 51*a*, 51*c* comprise between four to six preforms positioned side-by-side in each layer 58, 57, 56 and joined at chordwise joints 61. In other embodiments, the number of preforms in each layer may be more or less. The preforms include differently shaped preforms, in particular rectangular preforms as shown in FIG. 4*a* and rectangular preforms with a tapering first side face 67 or a tapering second side face 68. The preforms may have been provided with these different shapes or rectangular preforms may be machined after stacking to achieve the desired shape. The preforms 60 are arranged in a staggered or offset manner so that the chordwise joints 61 of adjacent layers are offset and do not coincide.

The second and fourth preform arrangements 51*b*, 51*d* comprise a single preform 60 in each layer 58, 57, 56 extending along the full chordwise width of the preform arrangement 51*b*, 51*d*.

The fifth preform arrangement 51*e* has an optimised cross-sectional shape to provide desired mechanical properties for a specific wind turbine blade 10 as illustrated in FIG. 6. Such an optimised shape can be provided using this method. In this particular embodiment, the shape provided by arranging various shaped preforms 60 in seven layers including five intermediate layers 57 and a top layer 58 and a bottom layer 56. Each layer 56, 57, 58 comprises between one to three preforms 60.

In order to save costs, the core portion of the spar cap 50 comprises both core inserts 70, 71 and the preform arrangement 51. When using a preform arrangement 51 shaped as the preform arrangements of FIG. 5*a* or 5*b*, the preform arrangement 51 is placed directly on shell fibre layers 95 and inserted between a first core insert 70 and a second core insert 71. The sides of the core inserts facing the preform arrangement 51 have a corresponding tapering shape so that the preform arrangement 51 form a scarf joint to the core inserts 70, 71 as shown in FIG. 7*a*.

Due to the increased drapability of preforms relative to traditional pultrusions, it is possible to use a preform arrangement 51 shaped as the preform arrangements of FIG. 5*c* or 5*d* with the more rigid core inserts 70, 71 having correspondingly shaped sides without risking pockets filled with resin in the cured spar cap as shown in FIG. 7*b*.

Once the preform arrangement 51 and core inserts 70, 71 are placed on the shell fibre layers 95 with a satisfactorily configured joint, they are covered by several layers of inner glass fibre sheets 96. The preform arrangement 51, the shell fibre layers 95, the inner fibre layers 96, and the exterior gelcoat (not shown) are then infused with a resin in the mould cavity under vacuum pressure of less than one atmosphere in a vacuum-assisted resin transfer moulding process. During the moulding process, the preforms 60 of the preform arrangement 51 are deformed to conform to the shape of the mould surface 92 due to the vacuum pressure and thus, any pockets that would end up being filled with resin in the cured spar cap 50 are eliminated. The preform arrangement 51, the shell fibre layers 95, the inner fibre layers 96, and the exterior gelcoat (not shown) are then cured together via the resin to form one of the first or second blade shell parts 24, 26 as best seen in FIG. 2 with the integrated spar cap 50. The process is then repeated for the other one of the first blade shell part 24 or second blade shell part 26. The two blade shell parts 24, 26 are then joined along the leading edge 18 and the trailing edge 20 to form the wind turbine blade 10.

LIST OF REFERENCES 2 wind turbine
4 tower
6 nacelle
8 hub
10 blade
14 blade tip
15 tip end
16 blade root
17 root end
18 leading edge
20 trailing edge
24 pressure side
26 suction side
30 root region
32 transition region
34 airfoil region
40 shoulder
50 spar cap
51 preform arrangement
51*a* first preform arrangement
51*b* second preform arrangement
51*c* third preform arrangement
51*d* fourth preform arrangement
51*e* fifth preform arrangement
52 top side
53 bottom side
54 leading edge end
55 trailing edge end
56 bottom layer
57 intermediate layer
58 top layer
60 preform
60*a* first preform
60*b* second preform
60*c* third preform
61 chordwise joint
65 top face
66 bottom face
67 first side face
68 second side face
70 first core insert
71 second core insert
91 blade mould
92 mould surface
93 root end
94 tip end
95 shell fibre layer
96 inner fibre layer
C chordwise direction
L longitudinal direction
T thickness direction
$T_{preform}$ preform thickness
$W_{preform}$ preform width

The invention claimed is:

1. A method of manufacturing a wind turbine blade extending along a longitudinal direction from a blade root through a root region and an airfoil region to a tip region with a blade tip, the wind turbine blade having a profiled contour including a pressure side, a suction side and a chord line extending between a leading edge and a trailing edge, the wind turbine blade comprising a shell providing an aerodynamic shape of the wind turbine blade and a spar cap forming a load carrying structure of the wind turbine blade, the method comprising the steps of:
- providing a blade mould for a wind turbine blade part having a mould cavity with a mould surface;
- placing one or more shell fibre layers and optionally an exterior coat on the blade mould surface;
- placing a plurality of separately provided preforms directly on the one or more shell fibre layers in a stacked arrangement, wherein each of the preforms comprises a mixture of fibre material and a binding agent, wherein the fibre material of each preform is at least partially joined together by means of the binding agent;
- infusing the stacked preform arrangement, the one or more shell fibre layers and, optionally the exterior coat, with a resin in mould cavity of the blade mould, each of the preforms plastically conforming to the mould surface during the infusing; and
- curing the stacked preform arrangement, the one or more shell fibre layers and, optionally the exterior coat, together via the resin to form a wind turbine blade part with a spar cap integrated in a shell part providing part of the aerodynamic shape of the wind turbine blade.

2. The method according to claim 1, wherein the stacked preform arrangement, the one or more shell fibre layers and, optionally the exterior coat, are infused in a vacuum pressure environment, optionally in a vacuum-assisted resin transfer moulding process.

3. The method according to claim 1, wherein the stacked preform arrangement comprises:
- two or more of the preforms in a chordwise direction ;
- two or more of the preforms in a thickness direction; and
- two or more of the preforms in a spanwise direction.

4. The method according to claim 3, wherein the plurality of preforms are arranged in a staggered manner or an offset manner in the stacked preform arrangement.

5. The method according to claim 1, wherein a core insert is placed directly on an exterior shell and adjacent to the stacked preform arrangement in a chordwise direction.

6. The method according to claim 5, wherein an end of the stacked preform arrangement facing the leading edge or the trailing edge of the wind turbine blade is beveled and an end of the stacked preform arrangement facing the interior of the wind turbine blade defines an acute angle with a beveled side, wherein the core insert has a beveled side, the method further comprises:
- placing the core insert directly on the exterior shell and subsequently placing the plurality of preforms directly on the exterior shell in the stacked arrangement so that, after infusion, the beveled side of the core insert and the beveled side of the stacked preform arrangement form a scarf joint.

7. The method according to claim 5, wherein an end of the stacked preform arrangement facing the leading edge or the trailing edge of the wind turbine blade is beveled and an end of the stacked preform arrangement facing the exterior of the wind turbine blade defines an acute angle with the beveled side, wherein the core insert has a beveled side, the method further comprises:
- placing the plurality of preforms directly on the exterior shell in the stacked arrangement and subsequently placing the core insert directly on the exterior shell so that, after infusion, the beveled side of the core insert and the beveled side of the stacked preform arrangement form a scarf joint.

8. A wind turbine blade obtainable by a method according to claim 1.

9. The method according to claim 4, wherein the plurality of preforms are arranged in the staggered manner or the offset manner in the stacked preform arrangement in a plane defined by a thickness direction and a chordwise direction.

10. A wind turbine blade with a profiled contour including a pressure side and a suction side with a thickness direction extending therebetween, and a leading edge and a trailing edge with a chord having a chordwise direction extending therebetween, the wind turbine blade extending in a spanwise direction between a root end and a tip end, a spar cap extending in the spanwise direction, the chordwise direction, and the thickness direction, the wind turbine blade comprising:
- an exterior shell providing the profiled contour of the wind turbine blade and comprising one or more shell fibre layers; and
- the spar cap being a sandwich-structured composite including one or more inner fibre layers and a core portion sandwiched between the one or more inner fibre layers and the exterior shell, the core portion comprising a plurality of separately provided preforms arranged in a stacked preform arrangement, wherein each of the preforms comprises a mixture of fibre material and a binding agent, wherein the fibre material is at least partially joined together by means of the binding agent, wherein the plurality of preforms and the exterior shell are joined together by means of a resin, wherein each of the preforms plastically conforms to the exterior shell,
- wherein an end of the stacked preform arrangement facing the leading edge or the trailing edge of the wind turbine blade is beveled and an end of the stacked preform arrangement facing the interior of the wind turbine blade defines an acute angle with a beveled side, wherein the beveled side of the stacked preform arrangement and a beveled side of the core insert form a scarf joint.

11. The wind turbine blade according to claim 10, wherein at least two adjacent preforms in a layer of the stacked preform arrangement are joined by a joint.

12. The wind turbine blade according to claim 10, wherein the core portion of the spar cap further comprises a core insert arranged directly on the exterior shell and adjacent to the stacked preform arrangement in a chordwise direction, wherein the core insert is of a different material than the preform arrangement.

13. The wind turbine blade according to claim 11, wherein the joint comprises a scarf joint or a butt joint.

14. A wind turbine blade with a profiled contour including a pressure side and a suction side with a thickness direction extending therebetween, and a leading edge and a trailing edge with a chord having a chordwise direction extending therebetween, the wind turbine blade extending in a spanwise direction between a root end and a tip end, a spar cap extending in the spanwise direction, the chordwise direction, and the thickness direction, the wind turbine blade comprising:
- an exterior shell providing the profiled contour of the wind turbine blade and comprising one or more shell fibre layers; and
- the spar cap being a sandwich-structured composite including one or more inner fibre layers and a core portion sandwiched between the one or more inner fibre layers and the exterior shell, the core portion comprising a plurality of separately provided preforms arranged in a stacked preform arrangement, wherein each of the preforms comprises a mixture of fibre material and a binding agent, wherein the fibre material is at least partially joined together by means of the binding agent, wherein the plurality of preforms and the exterior shell are joined together by means of a resin, wherein each of the preforms plastically conforms to the exterior shell, wherein an end of the stacked preform arrangement facing the leading edge or the trailing edge of the wind turbine blade is beveled and an end of the stacked preform arrangement facing the exterior of the wind turbine blade defines an acute angle with a beveled side, wherein the beveled side of the stacked preform arrangement and a beveled side of the core insert form a scarf joint.

15. The method according to claim 9, wherein the plurality of preforms are arranged in the staggered manner or the offset manner in the stacked preform arrangement in a plane defined by the thickness direction and a spanwise direction.

16. The method according to claim 15, wherein the plurality of preforms are arranged in the staggered manner or the offset manner in the stacked preform arrangement in a plane defined by the spanwise direction and the chordwise direction.

* * * * *